(12) United States Patent
Lu et al.

(10) Patent No.: US 7,173,777 B1
(45) Date of Patent: Feb. 6, 2007

(54) PROJECTION LENS AND DISPLAY DEVICE FOR MULTIMEDIA AND OTHER SYSTEMS

(75) Inventors: Kai Chang Lu, Birmingham (GB); Patricia M. Hughes, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/276,106

(22) Filed: Feb. 14, 2006

(51) Int. Cl.
*G02B 9/12* (2006.01)

(52) U.S. Cl. .................. 359/784; 359/754; 359/642

(58) Field of Classification Search .............. 359/784, 359/642, 651, 649, 648, 754
See application file for complete search history.

(56) References Cited

U.S. PATENT DOCUMENTS

| | | | |
|---|---|---|---|
| 4,070,098 A | 1/1978 | Buchroeder | |
| 4,256,373 A | 3/1981 | Horimoto | |
| 4,908,705 A | 3/1990 | Wight | |
| 5,363,242 A | 11/1994 | Yokota | |
| 5,390,048 A | 2/1995 | Miyatake et al. | |
| 5,442,484 A | 8/1995 | Shikawa | |
| 5,510,862 A | 4/1996 | Lieberman et al. | |
| 5,526,186 A | 6/1996 | Sekine | |
| 5,606,459 A | 2/1997 | Nakatsuji | |
| 5,625,495 A | 4/1997 | Moskovich | |
| 5,664,859 A | 9/1997 | Salerno et al. | |
| 5,870,228 A | 2/1999 | Kreitzer et al. | |
| 5,900,987 A | 5/1999 | Kreitzer | |
| 5,969,876 A | 10/1999 | Kreitzer et al. | |
| 5,978,150 A | 11/1999 | Hamanishi et al. | |
| 6,109,767 A | 8/2000 | Rodriguez | |
| 6,137,638 A | 10/2000 | Yamagishi et al. | |
| 6,179,426 B1 | 1/2001 | Rodriguez, Jr. et al. | |
| 6,224,216 B1 | 5/2001 | Parker et al. | |
| 6,439,726 B1 | 8/2002 | Piehler | |
| 6,476,981 B1 | 11/2002 | Shikama | |
| 6,542,316 B2 | 4/2003 | Yoneyama | |
| 6,578,999 B2 | 6/2003 | Schmidt et al. | |
| 6,580,469 B1 | 6/2003 | Rieche et al. | |
| 6,896,375 B2 | 5/2005 | Peterson et al. | |

(Continued)

FOREIGN PATENT DOCUMENTS

DE    29 20 360 A1    11/1980

(Continued)

OTHER PUBLICATIONS

Stupp, E.H., & Brennesholtz, M.S.; *Projection Displays;* John Wiley & Sons Ltd. (1999); pp. 146-150 and 205-208.

(Continued)

*Primary Examiner*—Timothy Thompson
*Assistant Examiner*—Jerry Fang
(74) *Attorney, Agent, or Firm*—Gregg H. Rosenblatt (57) ABSTRACT

A wide angle projection lens includes, in sequential order from an image side, a first lens group of negative refractive power, the first lens group having at least one aspheric surface, a second lens group, and a third lens group of positive refractive power. For the wide angle projection lens, the following Conditions (1) to (4) are satisfied: $|F_1/F| \geq 4.5$ (Condition (1)); $2.5 \leq |F_2/F| \leq 6.0$ (Condition (2)); $3.8 \leq |F_3/F| \leq 5.0$ (Condition (3)); and $0.8 \leq BFL/F \leq 1.4$ (Condition (4)). An optical engine, including the wide angle projection lens, can be implemented in a projection display device.

17 Claims, 3 Drawing Sheets

U.S. PATENT DOCUMENTS

| | | |
|---|---|---|
| 6,962,417 B1 | 11/2005 | Teng et al. |
| 2002/0057505 A1 | 5/2002 | Sato |
| 2002/0060859 A1 | 5/2002 | Yoneyama |
| 2004/0233394 A1 | 11/2004 | Gohman |
| 2005/0122484 A1 | 6/2005 | Rodriguez, Jr. et al. |
| 2005/0122599 A1 | 6/2005 | Lu |
| 2005/0135095 A1 | 6/2005 | Geissler |
| 2005/0157402 A1 | 7/2005 | Rodriguez, Jr. et al. |
| 2005/0237629 A1 | 10/2005 | Lu et al. |

FOREIGN PATENT DOCUMENTS

| | | |
|---|---|---|
| DE | 103 07 740 A1 | 9/2004 |
| JP | 62-201737 U | 12/1987 |
| JP | 02-027390 U | 2/1990 |
| JP | 02-196230 A | 8/1990 |
| JP | 02-230288 A | 9/1990 |
| JP | 03-027085 A | 2/1991 |
| JP | 03-056951 A | 3/1991 |
| JP | 07-151971 | 6/1995 |
| JP | 10-206969 | 8/1998 |
| JP | 2004-245893 | 9/2004 |
| WO | WO 97/16927 | 11/1980 |
| WO | WO 00/67059 | 11/2000 |
| WO | WO 2004/109365 A1 | 12/2004 |

OTHER PUBLICATIONS

Product Brochure, "Display Technologies by Carl Zeiss", Carl Zeiss Jena GmbH, Jena, Germany, date unknown.

PROJECTION LENS AND DISPLAY DEVICE FOR MULTIMEDIA AND OTHER SYSTEMS

FIELD OF INVENTION

The present invention relates to a projection lens and display device for use in a short throw distance display systems for multimedia and wall display applications. In particular, the present invention relates to a projection device that provides a wide-angle projection lens that allows for extreme off-axis image production and produces an image that is substantially distortion free and requires little to no keystone correction. The projection lens can be utilized in both front and rear projection applications.

BACKGROUND

Electronic or video display systems are devices capable of presenting video or electronically generated images. Whether used in home entertainment, advertising, videoconferences or group conferences, the demand exists for an appropriate display device.

Image quality is one of the factors consumers use to determine the appropriate display device. In general, image quality can be determined qualitatively by factors such as image resolution and image color. As the desire by some consumers is for display devices having larger picture size, image quality can suffer. Typically, a large picture size is one that exceeds about 40 inch screen size as measured along the diagonal of the screen.

While many display devices are available on the market today in front projection systems, there is a continuing need to develop other devices.

SUMMARY

An embodiment of the present invention, a wide angle projection lens, comprises, in sequential order from an output side, a first lens group of negative refractive power, the first lens group having at least one aspheric surface, a second lens group, and a third lens group of positive refractive power. For the wide angle projection lens, the following Conditions (1) to (4) are satisfied:

| | |
|---|---|
| $\|F_1/F\| \geq 4.5$ | Condition (1) |
| $2.5 \leq \|F_2/F\| \leq 6.0$ | Condition (2) |
| $3.8 \leq \|F_3/F\| \leq 5.0$ | Condition (3) |
| $0.8 \leq BFL/F \leq 1.4$ | Condition (4) |

Here, F is the focal length of the wide-angle projection lens, $F_1$ is the focal length of the first lens group, $F_2$ is the focal length of the second lens group, $F_3$ is the focal length of the third lens group, and BFL is the back focal length.

In one exemplary aspect, the effective focal length to image height ratio is about 0.5 to 1.0. In another exemplary aspect, the wide angle projection lens is part of an optical engine that also includes an illumination system and an imaging system. The optical engine can be disposed in a projection display device. In another exemplary embodiment, the third lens group comprises an aperture stop for the wide-angle projection lens, a first lens element and a second lens element, where the second lens element has an effective focal length of from about 30 mm to about 40 mm. Further, the second lens element can comprise a surface facing the aperture stop and a surface facing away from the aperture stop, where the curvature of the surface facing the aperture stop is greater than the curvature of the surface facing away from the aperture stop. The second lens element can be a single structure lens element, such as a bi-convex lens or a plano-convex lens.

Another embodiment of the present invention, a wide angle projection lens, comprises, in sequential order from an output side, a first lens group of negative refractive power, the first lens group having at least one aspheric surface, a second lens group, and a third lens group of positive refractive power. For the wide angle projection lens, the following Conditions (1) to (4) are satisfied:

| | |
|---|---|
| $1.3 \leq \|F_1/F\| \leq 2.0$ | Condition (1) |
| $\|F_2/F\| \geq 4.0$ | Condition (2) |
| $3.8 \leq \|F_3/F\| \leq 5.0$ | Condition (3) |
| $0.8 \leq BFL/F \leq 1.4$ | Condition (4) |

In one exemplary aspect, the effective focal length to image height ratio is about 0.5 to 1.0. The optical engine can be disposed in a projection display device. In another exemplary embodiment, the third lens group comprises an aperture stop for the wide-angle projection lens, a first lens element and a second lens element, where the second lens element has an effective focal length of from about 30 mm to about 40 mm. The second lens element can comprise a surface facing the aperture stop and a surface facing away from the aperture stop, where the curvature of the surface facing the aperture stop is greater than the curvature of the surface facing away from the aperture stop.

Another embodiment of the present invention, an optical engine, comprises an illumination system, an imaging system, and a projection lens having a back focal length of less than about 1.4 times the effective focal length and a speed of less than or equal to about F/3.1 or less. The projection lens generates an image at a half field angle of at least about 50° that has substantially no distortion and wherein the optical engine is part of a projection display device.

In other aspects of the present invention, the optical engine can be implemented in a wall-mounted projection system, a multimedia system, a rear projection TV system, and a compact integrated monitor system.

The optical system of the present invention is used in a short throw distance, extreme off-axis, projection system. The term "throw distance" means the distance defined by the normal from the projection screen to the projection lens. The phrase "short throw distance" means a distance of less than one meter. The term "extreme off-axis" means the projected image subtends an angle of greater than 45 degrees. In addition, the projection device projects an image having substantially no distortion. By substantially no distortion, it is meant that the distortion is no greater than 2%. In preferred aspects, the distortion is less than or equal to 1%, most preferably less than or equal to 0.5%. At these distortion values, for at least most imaging applications, no electronic distortion correction is required. The phrase "substantially zero refractive power" means less than 3% of the total lens power of all of the lens groups. In this document, the term "about" is presumed to modify all numerical values.

The above summary of the present invention is not intended to describe each illustrated embodiment or every implementation of the present invention. The figures and the detailed description that follows more particularly exemplify these embodiments.

These figures are not drawn to scale and are intended only for illustrative purposes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention relates to a wide angle projection lens for use in a projection display device having a short throw distance. In particular, the wide angle projection lens can be part of an optical engine that can be utilized in both front and rear projection systems. These projection systems can be adapted for use in, for example, an integrated multimedia or home theater system, a wall-mounted projection system, a rear projection television system, and a monitor system. In addition, the optical engine described herein is substantially distortion free and requires substantially no keystone correction.

Figure 1:
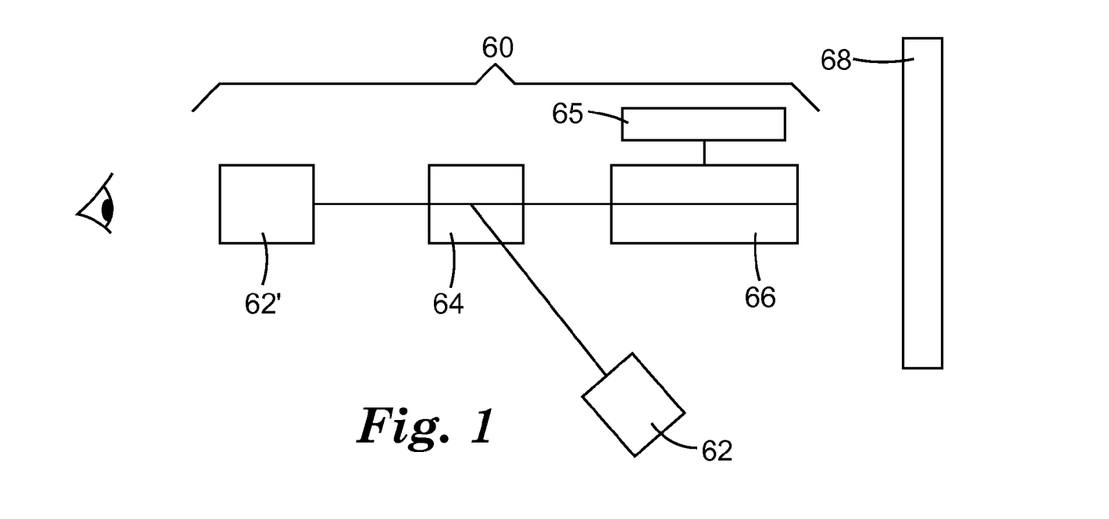
FIG. 1 is a schematic representation of an exemplary optical engine that can be used in the present invention.

FIG. 1 shows a schematic representation of exemplary optical engine 60 having one or more of the following components: illumination system 62 or 62', imaging system 64, a focus mechanism 65, and projection optics 66. While two different illumination systems 62 and 62' are shown, typically only one is used. When the illumination system lies in position depicted by reference number 62, the imager used is a reflective imager. In contrast, when the illumination system lies in position depicted by reference number 62', the imager used is a transmissive imager. The optical engine can generate an image on a projection screen or a viewing surface 68. Each element in the optical engine is discussed in detail below.

The illumination system 62, 62' can include a lamp unit, a filter (such as an infrared light and/or an ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps or tungsten halogen lamps or light emitting diodes (LED's) can be used. The type of filter, color wheel, and integrator that can be used in embodiments of the present invention are not critical. In one exemplary embodiment, the color separation means is a spinning red/green/blue (RGB) or red/green/blue/white (RGBW) color sequential disc in the light source of the imager. An illustrative commercially available color wheel is the UNAXIS RGBW color wheel, from UNAXIS Balzers, LTD, Balzers, Liechtenstein. A liquid crystal RGB color sequential shutter can also be used in embodiments of the present invention. An illustrative commercially available integrator is a hollow tunnel type integrator from UNAXIS Balzers LTD.

The imaging system 64 can include an imager and typically can also include conventional electronics. A useful reflective imager that can be used in the present invention is a XGA digital micromirror device (DMD) having a diagonal dimension of about 22 mm, available from Texas Instruments, Dallas, Tex. Alternatively, a transmissive or reflective liquid crystal display (LCD) can be used as the imager. In exemplary optical engine embodiments, the surface of the imager is positioned substantially parallel to the surface of the projection screen.

For some implementations, a focusing mechanism 65 can be accomplished by mounting one or more of the lenses described below on a slidable or threaded mount (not shown), which can be adjusted manually by hand or through the use of an electronic actuation mechanism. For example, focusing can be accomplished by using a varifocal or a zoom lens. Alternatively, no user focus is required for projection units having a predetermined fixed position established between the optical engine 60 and the viewing screen or surface 68 or for rear projection applications.

In some implementations, a screen 68 may comprise a multi-layer material, for example, a plurality of Fresnel elements configured as is described in U.S. Pat. No. 6,179,426. The screen can be designed to control light distribution spreading in the horizontal direction to accommodate viewers who are positioned horizontally in front of the screen. Alternative embodiments of the screen may comprise multi-layer film technology, Dual Brightness Enhancement Film (DBEF) technology, or VIKUITI™ technology, all available from 3M Company, Saint Paul, Minn. Optionally, the generated image can be viewed on any surface, e.g., a wall or other structure, or standard viewing screen.

Figure 2A:
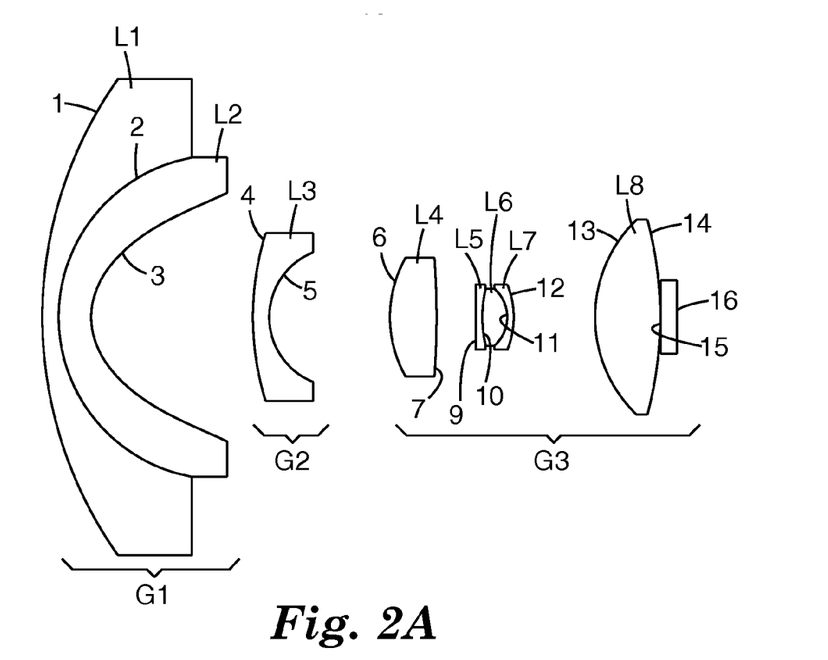
FIG. 2 is a schematic representation of an exemplary projection optics that can be used in the present invention.
Figure 2B:
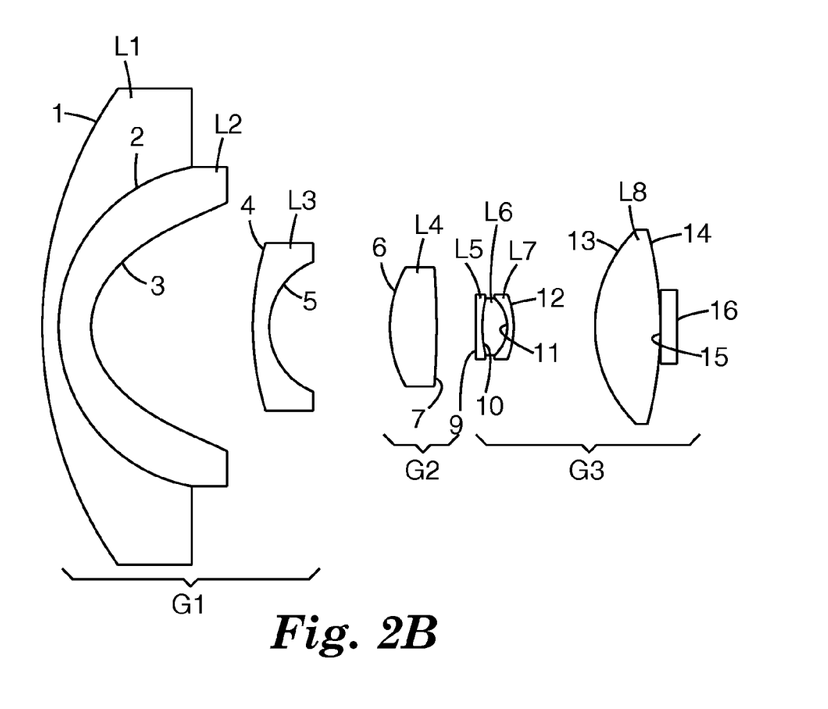

FIGS. 2A and 2B show exemplary embodiments of the projections optics (also referred to herein as a "projection lens" or a "wide-angle projection lens") of the optical engine 60. The projection optics of FIGS. 2A and 2B include three lens groups (as identified from an output side or screen side): first lens group (G1), second lens group (G2), and third lens group (G3). The term "output side" means that side of the projection lens closest to a viewing surface. The three lens groups are discussed in detail below. As would be apparent to one of ordinary skill in the art given the present description herein, alternative constructions of projection lens 66 can be employed, including alternative constructions that include fewer, the same, or greater numbers of lens elements.

In a first embodiment, the exemplary projection lens of FIG. 2A includes a total of eight (8) elements in the three lens groups, numbered from the output side. In this description, F is the total focal length of the projection lens, $F_1$ is the focal length of the first lens group, $F_2$ is the focal length of the second lens group, and $F_3$ is the focal length of the third lens group.

The first lens group (G1) can include, in order from the screen side, a first lens element (L1) of negative refractive power and a second lens element (L2) having an aspheric surface on its second surface. Preferably, G1 is of negative refractive power. The ratio of $F_1/F$ in G1 can be such that $|F_1/F| \geq 4.5$. In one exemplary embodiment, $|F_1/F|$ is about 5.1. In a preferred aspect, the lenses comprising G1 can have a substantially circular shape. Alternatively, the lenses comprising G1 can have a more oblong or oval lens shape with a rectangular aperture, a rectangular lens shape with a rectangular aperture, or a circular lens shape with a rectangular aperture.

The second lens group (G2) can include one lens element, (L3). In this embodiment, G2 is of negative refractive power. The ratio of $F_2/F$ in G2 can be such that $2.5 \leq |F_2/F| \leq 6$. In one exemplary embodiment, $|F_2/F|$ is about 4.2.

In this exemplary embodiment, the aperture stop lies within the third lens group (G3). The third lens group (G3) can include multiple lens elements, e.g., (L4) to (L8) inclusive. Preferably, G3 is of positive refractive power. The ratio of $F_3/F$ in G3 can be such that $3.8 \leq F_3/F \leq 5.0$. In one exemplary embodiment, $|F_3/F|$ is about 4.6. In this exemplary embodiment, L8, the lens closest to the illumination input can be considered as a "field lens."

In a preferred aspect, L8 can be a single structure lens, such as a bi convex or plano-convex lens, having an effective focal length of from about 30 mm to about 40 mm. In an alternative aspect, for example, in a rear projection application, L8 can have a focal length shorter than 30 mm if using a high index material, such as LaK34 glass to form L8.

In a preferred aspect, the first surface of lens element L8 can have a radius of curvature of about 25 mm. In addition, L8 can be substantially removed from the aperture stop of the projection lens. In another aspect, the curvature of the surface of L8 facing the aperture stop (e.g., surface 13) is greater than the curvature of the surface (e.g., surface 14) facing away from the aperture stop. In another aspect, the distance between L8 and L7 is from about 12 mm to about 17 mm. This spacing provides for a folding mirror to be placed in the optical engine as part of the illumination system.

In a second embodiment, the exemplary projection lens of FIG. 2B includes a total of eight (8) elements in the three lens groups, numbered from the output side. The first lens group (G1) can include a first lens element (L1) of negative refractive power, a second lens element (L2) having an aspheric surface on its second surface, and a third lens element (L3). Preferably, G1 is of negative refractive power. The ratio of $F_1/F$ in G1 can be such that $1.3 \leq |F_1/F| \leq 2.0$. In one exemplary embodiment, $F_1$ is from about −9.8 mm to about −11.5 mm.

The second lens group (G2) can include one lens element, (L4). In this embodiment, G2 is of positive refractive power. The ratio of $F_2/F$ in G2 can be such that $|F_2/F| \geq 4.0$. In one exemplary embodiment, $F_2$ is from about 27.5 mm to about 31 mm.

In this exemplary embodiment, the aperture stop lies between the second lens group (G2) and the third lens group (G3). The third lens group (G3) can include multiple lens elements, e.g., (L5) to (L8) inclusive. Preferably, G3 is of positive refractive power. The ratio of $F_3/F$ in G3 can be such that $3.8 \leq |F_3/F| \leq 5.0$. In one exemplary embodiment, $F_3$ is from about 26.8 mm to about 30.3 mm.

In this exemplary embodiment, the effective focal length of the entire lens is from about 6.4 mm to about 6.7 mm.

In more detail for the embodiments of FIGS. 2A and 2B, the first lens group G1 comprises a plurality of lens elements. For example, a first lens element (L1), lying closest to the viewing surface or screen, can have the largest diameter of all the lenses in the three lens groups. In one exemplary embodiment, the first lens element L1 in the first lens group has a sufficiently large diameter to project an image at a large field, i.e., at a half field angle greater than 45°, preferably greater than 50°, and most preferably about 55° or greater in the direction of the viewing surface or screen, with substantially no distortion.

For the embodiments of FIGS. 2A and 2B, the effective focal length to image height ratio can be from about 0.5 to 1.0. The effective focal length to image height ratio is determined by taking the effective focal length of the entire lens and dividing this number by the image height of the system. For example, if the lens has an EFL of 6.71 mm and the imager used in the optical engine has a diagonal of 13.4 mm, then the EFL to image height ratio is 6.71/13.4=0.51.

In another exemplary embodiment, the first lens element L1 in the first lens group has a diameter greater than about 60 mm and less than about 100 mm. In yet another exemplary embodiment, the first lens element of the first lens group has a diameter of about 90 mm. Thus, when implemented in a projection device, the first lens element can provide a field of view of about 110° to about 120°.

In the embodiments of FIGS. 2A and 2B, the first lens group G1 further includes a second lens element (L2) having at least one aspheric surface. The aspheric surface of the present exemplary embodiment can help reduce distortion effects, while still providing a large field of view. In one aspect, the second lens element can be fabricated from an optical polymer having a refractive index of about 1.49 and an Abbe number of about 57.2, such as polymethyl methacrylate (PMMA). The shape of the aspheric surface can be defined by the equation below:

$$Z = \frac{cr^2}{1 + \sqrt{1-(1-k)c^2r^2}} + a_2 r^2 + a_4 r^4 a_6 r^6 + a_8 r^8 + a_{10} r^{10} + a_{12} r^{12} + a_{14} r^{14} \qquad \text{(Equation I)}$$

where
Z is the surface sag at a distance r from the optical axis of the system
c is the curvature of the lens at the optical axis in $$\frac{1}{\text{mm}}$$

r is the radial coordinate in mm
k is the conic constant
$\alpha_2$ is the coefficient for the second order term, $\alpha_4$ is the coefficient for the fourth order term, $\alpha_6$ is the coefficient for the sixth order term, $\alpha_8$ is the coefficient for the eighth order term, $\alpha_{10}$ is the coefficient for the tenth order term, $\alpha_{12}$ is the coefficient for the twelfth order term, and $\alpha_{14}$ is the coefficient for the fourteenth order term.

In one embodiment, the second surface of the first element of the first lens group has a radius of curvature substantially equal to the radius of curvature of the first surface of the second lens element in the first lens group.

In another embodiment, the first lens group G1 includes two meniscus shaped, nested lens elements, a first meniscus shaped element made of glass and a second meniscus shaped element made of a plastic or acrylic, with a controlled thickness on the plastic/acrylic element. A material such as PMMA can be used. The two elements are spaced apart such that the ratio of the distance between the second surface of the first element and the first surface of the second element to the overall effective focal length of the projection lens is 1/175.

In an exemplary embodiment, the second shaped element comprises an aspheric lens (e.g., a lens having at least one aspheric surface) having a substantially uniform thickness throughout. This dome-shaped design can reduce thermal problems and can provide for straightforward manufacturing.

In an alternative embodiment, the first lens group G1 can comprise two shaped elements molded together to form one integral element. For example, the first shaped element can comprise a glass element and the second shaped element can comprise an acrylic or plastic (e.g., PMMA) element molded onto or cemented to the second surface of the first shaped element.

In another alternative, the lens element 1 (L1) and lens element 2 (L2) can comprise a single element (e.g., a single glass element), with an aspheric surface formed on the first surface, second surface, or both surfaces of the single element.

In an exemplary embodiment, the lens element 3 (L3) can have spherical surfaces and can be formed from glass. It provides a long negative effective focal length and its value varies from −2.5F to −6F, where F is the focal length for the entire projection lens.

In another exemplary embodiment, lens element 4 (L4) is a positive lens. Preferably, L4 can be a plano-convex or meniscus lens. In another exemplary embodiment, L4's surface that faces towards L3 (see e.g. surface 6 in the Tables below) can have a small radius of curvature, such that the effective focal length of L4 is larger than 4.0 F. Furthermore, L4 can be used as a focusing element in the projection lens. For a different throw distance, a sharp image can be obtained by moving L4 along optical axis.

In one exemplary embodiment, the lens elements 5, 6, and 7 (L5, L6, and L7) are formed as a cemented triplet to help control spherical aberration and coma. In an alternative embodiment, a doublet can be used to replace the triplet. In this alternative embodiment, one or both of the doublet elements can include an aspheric surface.

In another exemplary embodiment, the third lens group G3 can be of positive refractive power and all lens elements in this lens group can have spherical surfaces.

In another exemplary embodiment, the aperture stop of the projection lens 66 is located proximate to L5 (e.g., between L4 and L5, as shown in Table 1, or between L5 and L6, as shown in Table 4).

Lenses L5–L7 can comprise the same glass material or different glass materials. Example materials suitable for these lenses include those materials listed in the Tables below and other materials, including, but not limited to, N-SF1, N-SF4, N-SK5, N-SF6, N-LAK8, N-SF16, N-PSK53, N-SF57, and N-BK7, to name a few.

By way of example, for the embodiments shown in FIGS. 2A and 2B, example lenses were modeled. Tables 1, 4, and 7 below list the surface numbers for the three example lenses, in order from the output side (with surface 1 being the surface closest to the output side of the first lens element L1), the curvature (C) near the optical axis of each surface (in 1/millimeters), the on-axis spacing (D) between the surfaces (in millimeters), and the glass or other material type is also indicated. One skilled in the art will recognize that from the glass type, it is possible to determine the index of refraction and Abbe number of the material. Surface OBJ is the object surface or the surface of the viewing surface/screen. Identified surface numbers are shown in FIGS. 2A and 2B, where surfaces 15 and 16 correspond to the window glass of the exemplary DLP imaging device and "IMA" corresponds to the image plane.

In the embodiment as listed in Table 1, the wide-angle projection lens has an effective overall focal length of about 6.47 mm, a half field angle of about 56.58° in the direction of the output side and operates at F/2.6. The back focal length (BFL) is about 5.5 mm (in air). In a preferred aspect, the BFL is less than about 1.4 times the EFL. In addition, the projection lens can have a speed of less than or equal to about F/3.1 or less, and the projection lens generates an image at a half field angle of at least about 50°. For example, a first lens group G1 such as shown in FIG. 2A can have an effective focal length of −31.3 mm; a second lens group G2 such as shown in FIG. 2A can have an effective focal length of −37.5 mm; and a third lens group G3 such as shown in FIG. 2A can have an effective focal length of 30.6 mm. This example projection lens has a total track of 123.3 mm (from L1 to L8) in this exemplary embodiment. In another embodiment, such as is shown in FIG. 2B, a first lens group G1 can have an effective focal length of −11.4 mm; a second lens group G2 can have an effective focal length of 31.0 mm; and a third lens group G3 have an effective focal length of 30.3 mm. This example projection lens has a total track of 123.3 mm in this exemplary embodiment.

For the embodiments in FIGS. 2A–2B, the second surface of the lens element 2 (L2) (e.g., denoted as surface 3 in Table 1) is aspheric, as governed by Equation I above. The wide-angle projection lens of the embodiment of FIGS. 2A–2B has a total track distance of about 123.3 mm. As one skilled in the art will appreciate, in certain applications, such as front-projection display applications, it can be advantageous to have a short total track distance because it would result in a compact projection lens thus minimizing the space requirements of the overall optical engine.

For the following examples, Tables 1–3 correspond to a first example projection lens, Tables 4–6 correspond to a second example projection lens, and Tables 7–9 correspond to a third example projection lens.

TABLE 1

| Surface No. | C (mm⁻¹) | D (mm) | Glass Type |
| --- | --- | --- | --- |
| OBJ | 0 | 755 | |
| 1 | 0.0149 | 3 | N-BK7 |
| 2 | 0.0333 | 6 | ACRYLIC |
| 3 | 0.0823 | 32.44433 | |
| 4 | 0.0163 | 3 | N-SK16 |
| 5 | 0.0602 | 30.8284 | |
| 6 | 0.0397 | 4.030861 | N-SF6 |
| 7 | 0 | 9.343294 | |
| STOP | 0 | 1.0 | |
| 9 | 0.0195 | 1.2 | N-SF4 |
| 10 | 0.0799 | 4.447884 | N-SK5 |
| 11 | −0.0966 | 1 | N-SF6 |
| 12 | −0.0384 | 15 | |
| 13 | 0.04 | 12.00451 | N-BK7 |
| 14 | −0.0143 | 3 | |
| 15 | 0 | 3 | 1.472, 62.0 |
| 16 | 0 | 0.483 | |
| IMA | 0 | | |

Tables 2 and 3 below list the general lens data and the surface data summary for the first example lens.

TABLE 2

GENERAL LENS DATA:

| | |
| --- | --- |
| Surfaces | 17 |
| Stop | 8 |
| System Aperture | Image Space F/# = 2.6 |
| Glass Catalogs | SCHOTT MISC OHARA SCHOTT_2000 |

TABLE 2-continued

GENERAL LENS DATA:

| | |
|---|---|
| Ray Aiming | Paraxial Reference, Cache On |
| X Pupil Shift | 0 |
| Y Pupil Shift | 0 |
| Z Pupil Shift | 0 |
| Apodization | Uniform, Factor = 1.00000E+000 |
| Temperature (C.) | 2.00000E+001 |
| Pressure (ATM) | 1.00000E+000 |
| Effective Focal Length | 6.468447 (in air) |
| Effective Focal Length | 6.468447 (in image space) |
| Back Focal Length | 0.4616339 |
| Total Track | 129.7823 |
| Image Space F/# | 2.6 |
| Paraxial Working F# | 2.602087 |
| Working F/# | 2.643913 |
| Image Space NA | 0.1887066 |
| Object Space NA | 0.001589476 |
| Stop Radius | 4.92572 |
| Paraxial Image Height | 9.810052 |
| Paraxial Magnification | −0.008271678 |
| Entrance Pupil Diameter | 2.487864 |
| Entrance Pupil Position | 27.60445 |
| Exit Pupil Diameter | 26.59854 |
| Exit Pupil Position | −69.17757 |
| Field Type | Angle in degrees |
| Maximum Field | 56.58 |
| Primary Wave | 0.548 |
| Lens Units | Millimeters |
| Angular Magnification | 0.09353387 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 1116.485 | 0 |
| 1 | STANDARD | | 67.00772 | 3 | N-BK7 | 90 | 0 |
| 2 | STANDARD | | 30 | 6 | ACRYLIC | 37.76403 | 0 |
| 3 | EVENASPH | | 12.15014 | 32.44433 | | 27.88211 | −0.6627935 |
| 4 | STANDARD | | 61.33346 | 3 | N-SK16 | 34 | 0 |
| 5 | STANDARD | | 16.60462 | 30.8284 | | 26 | 0 |
| 6 | STANDARD | | 25.17034 | 4.030861 | N-SF6 | 22 | 0 |
| 7 | STANDARD | | Infinity | 9.343294 | | 22 | 0 |
| STO | STANDARD | | Infinity | 1.0 | | 0 | 0 |
| 9 | STANDARD | | 51.16039 | 1.2 | N-SF4 | 12.5 | 0 |
| 10 | STANDARD | | 12.51071 | 4.447884 | N-SK5 | 12 | 0 |
| 11 | STANDARD | | −10.35593 | 1 | N-SF6 | 12 | 0 |
| 12 | STANDARD | | −26.07301 | 15 | | 13 | 0 |
| 13 | STANDARD | | 25 | 12.00451 | N-BK7 | 36 | 0 |
| 14 | STANDARD | | −70 | 3 | | 36 | 0 |
| 15 | STANDARD | | Infinity | 3 | 1.472, 62.0 | 9.89623 | 0 |
| 16 | STANDARD | | Infinity | 0.483 | | 9.369676 | 0 |
| IMA | STANDARD | | Infinity | | | 9.243695 | 0 |

Tables 4–6 correspond to a second example projection lens.

TABLE 4

| Surface No. | C (mm$^{-1}$) | D (mm) | Glass Type |
|---|---|---|---|
| OBJ | 0 | 755 | |
| 1 | 0.0131 | 3 | N-BK7 |
| 2 | 0.0333 | 6 | ACRYLIC |
| 3 | 0.0746 | 29.83529 | |
| 4 | 0.0190 | 3 | N-BAF10 |
| 5 | 0.0774 | 22.2651 | |
| 6 | 0.0447 | 8.582311 | N-SF6 |

TABLE 4-continued

| Surface No. | C (mm$^{-1}$) | D (mm) | Glass Type |
|---|---|---|---|
| 7 | −0.0062 | 7.244238 | |
| 8 (Dummy) | 0 | | |
| 9 | −0.0011 | 1.2 | N-SF6 |
| STO/10 | 0.0449 | 4.6 | N-SK16 |
| 11 | −0.1414 | 1.2 | N-SF6 |
| 12 | −0.0625 | 15 | |
| 13 | 0.04 | 12.00451 | N-BK7 |
| 14 | −0.0143 | 0.1 | |
| 15 | 0 | 3 | 1.472, 62.0 |
| 16 | 0 | 0.483 | |
| IMA | 0 | | |

Please note that surface number 8 in Table 2 is a dummy surface and that the aperture stop is co-located with surface 10.

Tables 5 and 6 below list the general lens data and the surface data summary for the second example lens.

TABLE 5

GENERAL LENS DATA:

| | |
|---|---|
| Surfaces | 17 |
| Stop | 10 |
| System Aperture | Image Space F/# = 3 |
| Glass Catalogs | SCHOTT MISC OHARA SCHOTT_2000 |
| Ray Aiming | Paraxial Reference, Cache On |
| X Pupil Shift | 0 |

TABLE 5-continued

GENERAL LENS DATA:

| | |
|---|---|
| Y Pupil Shift | 0 |
| Z Pupil Shift | 0 |
| Apodization | Uniform, Factor = 1.00000E+000 |
| Temperature (C.) | 2.00000E+001 |
| Pressure (ATM) | 1.00000E+000 |
| Effective Focal Length | 6.600015 (in air) |
| Effective Focal Length | 6.600015 (in image space) |
| Back Focal Length | 0.5524066 |
| Total Track | 117.5145 |
| Image Space F/# | 3 |

TABLE 5-continued

GENERAL LENS DATA:

| | |
|---|---|
| Paraxial Working F# | 3.002891 |
| Working F/# | 3.024114 |
| Image Space NA | 0.164245 |
| Object Space NA | 0.00140599 |
| Stop Radius | 3.720277 |
| Paraxial Image Height | 9.794352 |
| Paraxial Magnification | −0.008444077 |
| Entrance Pupil Diameter | 2.200005 |
| Entrance Pupil Position | 27.36778 |
| Exit Pupil Diameter | 19.28059 |
| Exit Pupil Position | −57.77236 |
| Field Type | Angle in degrees |
| Maximum Field | 56 |
| Primary Wave | 0.548 |
| Lens Units | Millimeters |
| Angular Magnification | 0.1141047 |

TABLE 6

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 1580.363 | 0 |
| 1 | STANDARD | | 76.43678 | 3 | N-BK7 | 88 | 0 |
| 2 | STANDARD | | 30 | 6 | ACRYLIC | 59 | 0 |
| 3 | EVENASPH | | 13.39753 | 29.83529 | | 46 | −0.8724296 |
| 4 | STANDARD | | 52.61928 | 3 | N-BAF10 | 31 | 0 |
| 5 | STANDARD | | 12.91721 | 22.2651 | | 24 | 0 |
| 6 | STANDARD | | 22.39428 | 8.582311 | N-SF6 | 22 | 0 |
| 7 | STANDARD | | −160.9595 | 0 | | 22 | 0 |
| 8 | STANDARD | | Infinity | 7.244238 | | 0 | 0 |
| 9 | STANDARD | | −899.3512 | 1.2 | N-SF6 | 12 | 0 |
| STO | STANDARD | | 22.28334 | 4.6 | N-SK16 | 10.5 | 0 |
| 11 | STANDARD | | −7.069801 | 1.2 | N-SF6 | 10.5 | 0 |
| 12 | STANDARD | | −16.00767 | 15 | | 12 | 0 |
| 13 | STANDARD | | 25 | 12.00451 | N-BK7 | 36 | 0 |
| 14 | STANDARD | | −70 | 0.1 | | 36 | 0 |
| 15 | STANDARD | | Infinity | 3 | 1.472, 62.0 | 13.58104 | 0 |
| 16 | STANDARD | | Infinity | 0.483 | | 13.39876 | 0 |
| IMA | STANDARD | | Infinity | | | 13.35556 | 0 |

Tables 7–9 correspond to a third example projection lens.

TABLE 7

| Surface No. | C (mm$^{-1}$) | D (mm) | Glass Type |
|---|---|---|---|
| OBJ | 0 | 755 | |
| 1 | 0.0119 | 3 | N-BK7 |
| 2 | 0.0333 | 6 | ACRYLIC |
| 3 | 0.0730 | 32.6153 | |
| 4 | 0.0129 | 3 | N-SK16 |
| 5 | 0.0720 | 22.35666 | |
| 6 | 0.0434 | 9.493437 | N-SF6 |
| 7 | −0.0015 | 6.794976 | |
| STO | 0 | 1.0 | |
| 9 | −0.0072 | 1.2 | N-SF1 |
| 10 | 0.0472 | 4.6 | N-SK16 |
| 11 | −0.1380 | 1.2 | N-SF6 |
| 12 | −0.0622 | 15 | |
| 13 | 0.04 | 12.00451 | N-BK7 |
| 14 | −0.0143 | 3 | |
| 15 | 0 | 3 | 1.472, 62.0 |
| 16 | 0 | 0.483 | |
| IMA | 0 | | |

Tables 8 and 9 below list the general lens data and the surface data summary for the third example lens.

TABLE 8

GENERAL LENS DATA:

| | |
|---|---|
| Surfaces | 17 |
| Stop | 8 |
| System Aperture | Image Space F/# = 3 |
| Glass Catalogs | SCHOTT MISC OHARA SCHOTT_2000 |
| Ray Aiming | Paraxial Reference, Cache On |
| X Pupil Shift | 0 |
| Y Pupil Shift | 0 |
| Z Pupil Shift | 0 |
| Apodization | Uniform, Factor = 1.00000E+000 |
| Temperature (C.) | 2.00000E+001 |
| Pressure (ATM) | 1.00000E+000 |
| Effective Focal Length | 6.600098 (in air) |
| Effective Focal Length | 6.600098 (in image space) |
| Back Focal Length | 0.4419799 |
| Total Track | 124.7479 |
| Image Space F/# | 3 |
| Paraxial Working F# | 3.002246 |
| Working F/# | 3.04586 |
| Image Space NA | 0.1642793 |

TABLE 8-continued

GENERAL LENS DATA:

| | |
|---|---|
| Object Space NA | 0.001405376 |
| Stop Radius | 3.97923 |
| Paraxial Image Height | 9.792374 |
| Paraxial Magnification | −0.008438577 |
| Entrance Pupil Diameter | 2.200033 |
| Entrance Pupil Position | 27.71955 |
| Exit Pupil Diameter | 24.79572 |
| Exit Pupil Position | −74.42818 |
| Field Type | Angle in degrees |
| Maximum Field | 56 |
| Primary Wave | 0.548 |
| Lens Units | Millimeters |
| Angular Magnification | 0.08872631 |

TABLE 9

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 1580.945 | 0 |
| 1 | STANDARD | | 83.68771 | 3 | N-BK7 | 88 | 0 |
| 2 | STANDARD | | 30 | 6 | ACRYLIC | 59 | 0 |
| 3 | EVENASPH | | 13.69548 | 32.6153 | | 46 | −0.8942559 |
| 4 | STANDARD | | 77.23397 | 3 | N-SK16 | 31 | 0 |
| 5 | STANDARD | | 13.89109 | 22.35666 | | 24 | 0 |
| 6 | STANDARD | | 23.0284 | 9.493437 | N-SF6 | 22 | 0 |
| 7 | STANDARD | | −676.6521 | 6.794976 | | 22 | 0 |
| STO | STANDARD | | Infinity | 1.0 | | 0 | 0 |
| 9 | STANDARD | | −138.0564 | 1.2 | N-SF1 | 12 | 0 |
| 10 | STANDARD | | 21.19504 | 4.6 | N-SK16 | 10.5 | 0 |
| 11 | STANDARD | | −7.244446 | 1.2 | N-SF6 | 10.5 | 0 |
| 12 | STANDARD | | −16.08746 | 15 | | 12 | 0 |
| 13 | STANDARD | | 25 | 12.00451 | N-BK7 | 36 | 0 |
| 14 | STANDARD | | −70 | 3 | | 36 | 0 |
| 15 | STANDARD | | Infinity | 3 | 1.472, 62.0 | 13.87837 | 0 |
| 16 | STANDARD | | Infinity | 0.483 | | 13.54066 | 0 |
| IMA | STANDARD | | Infinity | | | 13.46008 | 0 |

The data provided in the Tables above represent only a few examples and are not intended to limit the scope of the invention described herein.

Figure 3:
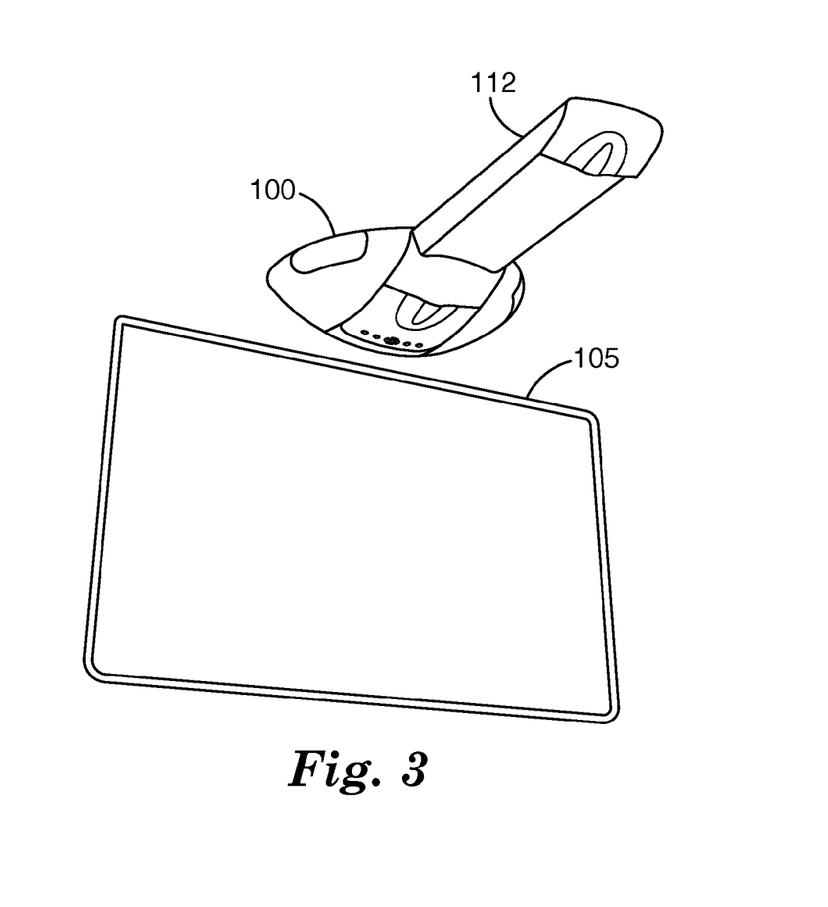
FIG. 3 is a schematic representation of a wall-mounted projection system utilizing the exemplary optical engine.

The optical engine described above can be utilized in a variety of front projection and rear projection applications. For example, FIG. 3 shows one exemplary embodiment of a front projection application, a wall-mounted projection system utilizing the exemplary optical engine described above. A projector wall mount unit 100, which includes an optical engine such as described above, can be mounted to a wall or other structure using conventional mounting bolts or the like. Unit 100 shown in FIG. 3 is in an open position. When operated, a movable member 112 (e.g., a sliding tray, sliding arms, telescopic arm(s), threaded rod(s), or the like) emerges from unit 100 to place the optical engine at a distance from the wall or a viewing screen 105, upon which an image can be viewed. Screen 105 can be constructed in a manner such as that described above. Screen 105 can alternatively be constructed as a digital whiteboard, such as described in U.S. Pat. No. 6,179,426. Alternatively, wall mount unit 100 can be mounted on a different wall (e.g., a side wall) from the screen 105.

Figure 4:
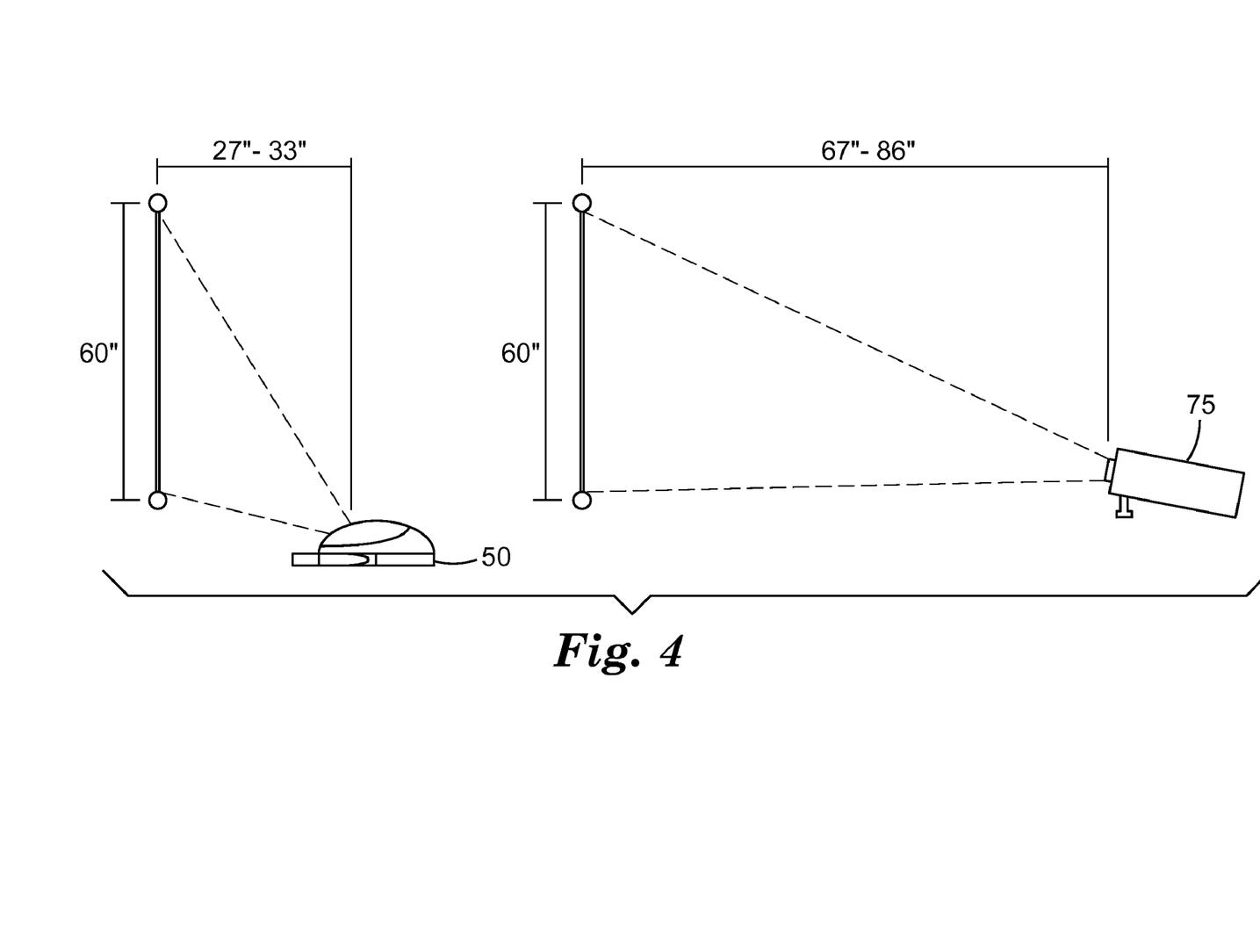
FIG. 4 shows an illustration of the short throw distance achieved by the exemplary optical engine versus a conventional front projector.

Due to the large field of view of the optical engine described herein, unit 100 can provide a large image size at a short throw distance. FIG. 4 shows an illustrative comparison between a projection unit 50, which includes an exemplary optical engine such as described above, and a conventional projector 75. As shown in FIG. 4, an exemplary optical engine (here implemented in a table top projector 50) can be placed at a relatively short distance (e.g., 27–33 inches) from the viewing screen or surface to produce a 60 inch image size (as measured diagonally). Thus, in one exemplary embodiment, the ratio of the distance from the viewing screen to the image size (diagonal, 4×3 format) can be about 1.8–2.2 to 1. As shown in FIG. 4, as a comparison, a conventional projection system 75 has a ratio of the distance from the viewing screen to the image size (diagonal, 4×3 format) of about 0.7–0.9 to 1. The terms "4×3 format" and "16×9 format" refer to conventional image formats as measured by the image width versus the image height.

For example, for an image size of about 40 inches (diagonal, 4×3 format), the optical engine is placed at a distance from the screen of about 18–22 inches. For a 60 inch (diagonal, 4×3 format) image size, the optical engine is placed at a distance from the screen of about 27–33 inches. Of course, the exemplary optical engine described herein can provide an image size of greater than 60 inches (diagonal, 4×3 format), if necessary, using a relatively short throw distance at an extreme off-axis position. In a preferred embodiment, the image size is at least about 25 inches.

In exemplary embodiments, the throw ratios for an exemplary projection lens such as is described above, having an effective focal length of from about 6.41 to about 6.51 and utilizing an exemplary imager, such as a 0.53" 480p imager, are described in Table 10 below:

TABLE 10

| Distance from lens to viewing surface | Magnification | Image Size (diagonal) |
|---|---|---|
| 500 mm | 82.2 | 43.6" |
| 750 mm | 120.1 | 63.7" |
| 1000 mm | 158.2 | 83.8" |
| 1250 mm | 103.9 | 103.9" |

In addition, the optical engine is designed so that little or no keystone correction is necessary, while distortion is reduced. For example, distortion values for the projected image can be less than or equal to 2%, preferably less than or equal to 1.0%, and more preferably less than or equal to 0.5% (e.g., where distortion (d) can be determined by: d=(H−h)/h*100, where h is the paraxial image height and H is actual image height). In one exemplary embodiment, the optical engine can provide an image having a 4×3 format. In another exemplary embodiment, the optical engine can be implemented with a suitable imager to provide a different screen format, such as a 16×9 format.

Alternatively, the optical engine can be implemented with correction circuitry (e.g., a conventional warp chip), which can result in sufficient image quality at even shorter throw distances.

The optical engine described above can be used in a variety of other applications, such as described in, for example, pending U.S. application Ser. Nos. 11/003,252 and U.S. Ser. No. 11/003,278, incorporated by reference herein in their entirety. The optical engine described above can also be utilized in a variety of rear projection applications, for example, as is described in pending U.S. application Ser. No. 11/090,370, incorporated by reference herein in its entirety.

The optical engine of the present invention is designed to provide large image sizes from short distances and at extreme off-axis positions in a variety of front projection implementations. In addition, the optical engine described herein is substantially distortion free and requires little to no keystone correction.

Those skilled in the art will appreciate that the present invention may be used with a variety of different optical components. While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

What is claimed is:

1. A wide-angle projection lens comprising the following components in sequential order from an image side:
   (a) a first lens group of negative refractive power, the first lens group having at least one aspheric surface;
   (b) a second lens group;
   (c) a third lens group of positive refractive power; and
   wherein the following Conditions (1) to (4) are satisfied:

$|F_1/F| \geq 4.5$      Condition (1)

$2.5 \leq |F_2/F| \leq 6.0$      Condition (2)

$3.8 \leq |F_3/F| \leq 5.0$      Condition (3)

$0.8 \leq BFL/F \leq 1.4$      Condition (4)

where
   F is the focal length of the wide-angle projection lens;
   $F_1$ is the focal length of the first lens group;
   $F_2$ is the focal length of the second lens group;
   $F_3$ is the focal length of the third lens group; and
   BFL is the back focal length.

2. The wide-angle projection lens of claim 1, wherein the effective focal length to image height ratio is about 0.5 to 1.0.

3. An optical engine comprising:
   (a) an illumination system;
   (b) an imaging system; and
   (c) the wide-angle projection lens of claim 1;
   wherein the optical engine is disposable in a projection display device.

4. The wide-angle projection lens of claim 1, wherein the third lens group comprises an aperture stop for the wide-angle projection lens, a first lens element and a second lens element, wherein the second lens element has an effective focal length of from about 30 mm to about 40 mm.

5. The wide-angle projection lens of claim 4, wherein the second lens element comprises a surface facing the aperture stop and a surface facing away from the aperture stop, wherein the curvature of the surface facing the aperture stop is greater than the curvature of the surface facing away from the aperture stop.

6. The wide-angle projection lens of claim 4, wherein the second lens element is a single structure lens element.

7. The wide-angle projection lens of claim 6, wherein the single structure lens element is one of a bi-convex lens and a plano-convex lens.

8. The wide-angle projection lens of claim 1, wherein the first lens group has an oblong shape and a rectangular aperture.

9. A wide-angle projection lens comprising the following components in sequential order from an image side:
   (a) a first lens group of negative refractive power, the first lens group having at least one aspheric surface;
   (b) a second lens group;
   (c) a third lens group of positive refractive power; and
   wherein the following Conditions (1) to (4) are satisfied:

$1.3 \leq |F_1/F| \leq 2.0$      Condition (1)

$|F_2/F| \geq 4.0$      Condition (2)

$3.8 \leq |F_3/F| \leq 5.0$      Condition (3)

$0.8 \leq BFL/F \leq 1.4$      Condition (4)

where
   F is the focal length of the wide-angle projection lens;
   $F_1$ is the focal length of the first lens group;
   $F_2$ is the focal length of the second lens group;
   $F_3$ is the focal length of the third lens group;
   BFL is the back focal length.

10. The wide-angle projection lens of claim 9, wherein the effective focal length to image height ratio is about 0.5 to 1.0.

11. An optical engine comprising:
    (a) an illumination system;
    (b) an imaging system; and
    (c) the wide-angle projection lens of claim 9;
    wherein the optical engine is disposable in a projection display device.

12. The wide-angle projection lens of claim 9, wherein the third lens group comprises an aperture stop for the wide-angle projection lens, a first lens element and a second lens element, wherein the second lens element has an effective focal length of from about 30 mm to about 40 mm.

13. The wide-angle projection lens of claim 12, wherein the second lens element comprises a surface facing the aperture stop and a surface facing away from the aperture stop, wherein the curvature of the surface facing the aperture stop is greater than the curvature of the surface facing away from the aperture stop.

14. The wide-angle projection lens of claim 12, wherein the second lens element is a single structure lens element.

15. The wide-angle projection lens of claim 9, wherein the first lens group has an oblong shape and a rectangular aperture.

16. An optical engine comprising:
    (a) an illumination system;
    (b) an imaging system; and
    (c) a projection lens having a back focal length of less than about 1.4 times the effective focal length and a speed of less than or equal to about F/3.1 or less, and wherein the projection lens generates an image at a half field angle of at least about 50° that has substantially no distortion and wherein the optical engine is part of a projection display device.

17. The wide-angle projection lens of claim 16, wherein the effective focal length to image height ratio is about 0.5 to 1.0.

* * * * *

UNITED STATES PATENT AND TRADEMARK OFFICE
CERTIFICATE OF CORRECTION

PATENT NO. : 7,173,777 B1  
APPLICATION NO. : 11/276106  
DATED : February 6, 2007  
INVENTOR(S) : Kai Chang Lu Page 1 of 1

It is certified that error appears in the above-identified patent and that said Letters Patent is hereby corrected as shown below:

Column 6,
Line 30, delete

" $Z = \dfrac{cr^2}{1+\sqrt{1-(1+k)c^2r^2}} + a_2 r^2 + a_4 r^4 + a_6 r^6 + a_8 r^8 + a_{10} r^{10} + a_{12} r^{12} + a_{14} r^{14}$ " and insert in place thereof -- $Z = \dfrac{cr^2}{1+\sqrt{1-(1+k)c^2r^2}} + \alpha_2 r^2 + \alpha_4 r^4 + \alpha_6 r^6 + \alpha_8 r^8 + \alpha_{10} r^{10} + \alpha_{12} r^{12} + \alpha_{14} r^{14}$ --.

Signed and Sealed this

Twelfth Day of June, 2007

JON W. DUDAS  
*Director of the United States Patent and Trademark Office*